Patented Oct. 30, 1928.

1,690,051

UNITED STATES PATENT OFFICE.

ERNEST E. BOARD, OF WHITE LAKE, SOUTH DAKOTA.

PUNCTUREPROOF COMPOSITION FOR PNEUMATIC TIRES.

No Drawing. Application filed April 11, 1927. Serial No. 183,008.

This invention relates to a composition for lining the inner tube of a pneumatic tire, the object being to produce a composition which will act effectively to stop an incipient leak or seal the puncture when one occurs.

In carrying out my invention I provide a mixture of bran, flaxseed meal and corn syrup with a certain proportion of an anti-freeze solution. These ingredients are applied in the proportion of 1 part of bran, 1 part of flaxseed meal, moistened with 1 part of water and thoroughly mixed with 2 parts of corn syrup and 2 parts of a solution marketed by the Pyrene Manufacturing Company under the name of "chromine", containing calcium chloride 27.50% and potassium chromate, $K_2CrO_4$ (anhydrous) 1% the balance being distilled water. These ingredients are mixed to a fluid pasty condition, the inner tire is deflated, the valve stem removed and the composition introduced with a force pump and while the wheel is jacked up and after introduction of the solution the wheel is rotated to distribute the compound against the soft vulcanized surface of the inner tube. The valve stem is then inserted and the tire inflated. The pumping action in inflating the tire forces the liquid into a thick film of sticky consistency which is very adherent to the walls of the rubber, while the chromine compound prevents freezing of the compound against the walls of the rubber, preserving its adherence to the walls. The antifreeze solution not only checks the freezing and detachment of the viscous material from the rubber, but also acts as a preservative of the rubber. The bran and flaxseed which are in a meal form constitute a body for the composition, the oily nature of the flaxseed keeping the rubber in a soft condition and the glutinous nature of the bran affording a tenacious bond causing adherence to the walls of the tire, which is further contributed to by the viscid nature of the corn syrup containing a considerable proportion of glucose which prevents the composition from drying out.

When the car containing the tire is in use the high speed of rotation under the weight thrust of the machine creates a very high pressure auxiliary to that of the pump pressure on the puncture-proof lining and forces it into intimate engagement in a dense film on the inside of the inner tube. Any tendency towards a crack is instantly sealed by the air pressure within the tube and in case of puncture the layer of glutinous compound is driven from the entire body of the tire by the air pressure into the puncture, blocking it up and sealing it.

Having thus described my invention, what I claim as new and desire to secure by Letters Patent is:

A puncture-proof composition for inner pneumatic tires containing 1 part bran, 1 part of flaxseed meal, 2 parts of corn syrup and 2 parts of an anti-freeze solution containing calcium chloride 27.50% and potassium chromate 1 diluted with water to a pasty condition for introduction to an inner vulcanized pneumatic tire.

In testimony whereof I affix my signature.

ERNEST E. BOARD.